United States Patent
Anelli et al.

(10) Patent No.: US 6,577,796 B2
(45) Date of Patent: Jun. 10, 2003

(54) WATER-RESISTANT CABLE

(75) Inventors: Pietro Anelli, Cremona (IT); Gianfranco Colombo, Sesto San Giovanni (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/827,161

(22) Filed: Apr. 6, 2001

(65) Prior Publication Data

US 2002/0041744 A1 Apr. 11, 2002

Related U.S. Application Data

(63) Continuation of application No. PCT/EP99/07511, filed on Oct. 6, 1999.
(60) Provisional application No. 60/104,637, filed on Oct. 16, 1998.

(30) Foreign Application Priority Data

Oct. 7, 1998 (EP) .............................. 98118900

(51) Int. Cl.$^7$ ................................ G02B 6/44
(52) U.S. Cl. .................. 385/112; 385/103; 385/110; 385/109
(58) Field of Search ................ 385/100–114; 174/77 R, 92, 93, 23 R (56) References Cited

U.S. PATENT DOCUMENTS

| | | | |
|---|---|---|---|
| 4,726,649 A | | 2/1988 | Funaki et al. |
| 4,767,184 A | * | 8/1988 | Ogasawara et al. ....... 174/23 R |
| 4,837,077 A | | 6/1989 | Anton et al. |
| 4,867,526 A | | 9/1989 | Arroyo |
| 5,138,685 A | | 8/1992 | Arroyo et al. |
| 5,187,763 A | | 2/1993 | Tu |
| 5,285,513 A | | 2/1994 | Kaufman et al. |
| 5,642,452 A | * | 6/1997 | Gravely et al. ............. 385/103 |
| 5,684,904 A | * | 11/1997 | Bringuier et al. ........... 385/106 |
| 6,304,699 B2 | * | 10/2001 | Field et al. ................. 385/100 |
| 6,304,701 B1 | * | 10/2001 | Bringuier et al. ........... 385/100 |

FOREIGN PATENT DOCUMENTS

| | | |
|---|---|---|
| DE | 1 765 647 | 8/1971 |
| DE | 196 46 484 A1 | 5/1997 |
| EP | 0 378 940 A1 | 7/1990 |
| EP | 0 395 838 B1 | 11/1990 |
| EP | 0 541 007 A1 | 5/1993 |
| EP | 0 732 374 A2 | 9/1996 |
| EP | 0 811 864 A1 | 12/1997 |

* cited by examiner

Primary Examiner—Hemang Sanghavi
Assistant Examiner—Scott A Knauss
(74) Attorney, Agent, or Firm—Finnegan, Henderson, Farabow, Garrett & Dunner, L.L.P.

(57) ABSTRACT

The present invention relates to a cable, in particular an optical fiber cable, which is resistant to the radial permeation and to the longitudinal propagation of water. This cable contains a water-soluble polymer material which is a water-swellable and water-soluble material. In particular, this cable is characterized in that, following the ingress of water into this cable, the propagation of water is impeded on account of the combined effect of the swelling of the water-soluble material and the formation of an aqueous solution of said material which has a predetermined viscosity, so as to impede the passage of the residual water. Preferably, the water-soluble material is chosen from polyacrylamide, modified polyvinyl alcohol, vinyl alcohol/vinyl acetate copolymers, polyvinylpyrrolidone, and mixtures thereof, the material preferably being a vinyl alcohol/vinyl acetate copolymer. The material can advantageously be extruded to form tubular elements for containing optical fibers, for example, two-layer tubular elements in which the inner layer is made of water-soluble material and the outer layer is made of a conventional polymer such as PE, PP or PBT.

29 Claims, 3 Drawing Sheets

WATER-RESISTANT CABLE

This application is a continuation of International Application No. PCT/EP99/07511, filed Oct. 6, 1999, and claims the priority of EP98118900.4, filed Oct. 7, 1998, and the benefit of U.S. Provisional application No. 60/104,637, filed Oct. 16, 1998.

FIELD OF INVENTION

The present invention relates to a cable, in particular an optical fibre cable, which is resistant to the radial permeation and to the longitudinal propagation of water.

The present invention also relates to a method for maintaining a high resistance to the passage of water, both in the liquid state and in the vapour state, inside cables, in particular optical fibre cables.

BACKGROUND OF THE INVENTION

Cables, and in particular optical fibre cables, are used in ambient conditions which include contact with water, both in liquid form and in vapour form.

The presence of water molecules inside optical cables, and in particular close to optical fibres, results in reduction of the transmission capacities of the fibres.

The said reduction in the transmission capacities of the fibres is due in particular to the diffusion of water vapour across ink secondary and primary coatings on the optical fibre and subsequent condensation of water at the ink-secondary coating and glass-primary coating interface. This condensation can lead to local detachment between the ink and the secondary coating or between the glass and the primary coating, giving rise to irregular mechanical stresses ("microbending"), which can cause attenuation of the signal transmitted.

Contact of optical fibres with liquid water can occur either following penetration of water from a poorly wrapped end (during storage or laying of the cable) or following accidental damage to this sheath.

The presence of water, in particular of water in the liquid state, and the possibility of its longitudinal propagation inside cables is also a possible cause of damage to the apparatus to which the cables are connected. In view of the above observations, it is therefore advantageous to block the propagation of water and to limit as much as possible the length of cable which, after contact with water, will have to be decontaminated.

Contact of the optical fibres inside a cable with water in the vapour state occurs when this water permeates through the layers which make up the optical cable, thus being able to get inside to where the optical fibres are located. Up to quite high relative humidity values (typically of about 75–80%), the optical fibres are not adversely affected by the presence of water vapour and can even remain under such conditions for years. Above this threshold, the high humidity in contact with the surface of the optical fibres can lead to drawbacks similar to those caused by contact with liquid water (for example delamination, local detachment between glass and coating and/or detachment between the various coating layers, microbending phenomena) which can result in increases in attenuation. Lastly, prolonged contact of water (either liquid water or water in the vapour state) with the surface of the fibre, such as that which occurs after glass-primary coating delamination, can lead to a reduction in the mechanical strength of the glass part of the fibre.

A range of solutions for limiting or preventing the entry of water into cables is disclosed in the prior art.

For example, to limit the penetration of liquid water into optical fibre cables, it is known practice to introduce a fluid blocking filling material, typically a grease or a thickened oil, into the structure of the cable in order to establish a physical barrier to the passage of water into the cable. These filling materials, since they not have any particular physicochemical interactions with the water, are also known as "inert blocking materials".

Examples of these inert blocking filling materials are disclosed in patents EP 811,864, U.S. Pat. No. 5,285,513, U.S. Pat. No. 5,187,763 and EP 541,007.

The introduction of the said inert blocking filling materials into the structure of the optical cable during production is often laborious, such as processing of the ends ("heads") of these cables, which need to be wrapped so as to prevent any loss of the filling material. In addition, during installation and/or maintenance of the cable, in order to be able to make junctions between the different pieces of cable, it is necessary to wash off the blocking filling material from all of the components of the optical cable, which can result in damage to the optical fibres due to the action of the solvents and friction.

Another known solution for limiting the ingress of water into optical cables envisages the use of water-swellable materials, i.e. substances capable of absorbing a certain amount of water, thereby increasing their volume. In contrast with the materials described above, these materials are also known as "active blocking materials".

Typically, these water-swellable materials are distributed on supports made of fibrous plastic material, for example tapes or yarns, which are placed close to the cable structures which it is desired to protect against contact with water.

For example, U.S. Pat. No. 4,867,526 describes a cable comprising a tape made of nonwoven material (in particular polyester) impregnated with a solution of water-absorbing material, in particular polyacrylic acid made insoluble by crosslinking, which is capable of expanding on contact with water.

U.S. Pat. No. 5,138,685 describes a cable comprising a laminated tape consisting of two superimposed layers of nonwoven polymer material, between which is placed a water-swellable material in powder form.

U.S. Pat. No. 5,642,452 describes a cable comprising a yarn impregnated with water-swellable material, in particular polyacrylic acid. This yarn is wound around a central reinforcing element together with tubular elements containing the optical fibres which are filled with a conventional "inert" blocking material. According to the disclosure given in that patent, this configuration is capable of preventing the longitudinal passage of water in the star-shaped areas created by the helical winding of the tubular elements around the central element.

U.S. Pat. No. 4,767,184 describes an optical cable with a grooved core, in which grooves are placed several strips of superimposed optical fibres, each coated with a film of resin containing a water-swellable or swelling material. In combination with the strips of optical fibres with a coating containing water-swellable material, a coating of the same material applied to the grooved core can be used, whereas in the grooves in which no strips of optical fibres are present it is necessary to use a powder made of water-absorbing material.

German Patent DE 1,765,647, relating to conventional metal-conductor telecommunication cables, discloses a 4-wire cable wherein the cable core and the wires are lapped up with a 100 $\mu$m thickness foil made of a low saponification highly polymerised polyvinylalcohol.

The Applicant has observed that if water-swellable fibrous tapes are used, during manufacture of the cable it is necessary to include an additional wrapping operation. Moreover, the problem of release of the water-swellable powders often arises, with the result, on the one hand, that the water-blocking effect is lower where it is needed and, on the other hand, during installation/maintenance, the structure of the cable needs to be free of the presence of these powders.

Moreover, once the water-absorbing effect is complete, the known water-swellable materials behave like inert filling materials, by establishing a simple physical barrier to the passage of water. It is thus necessary to provide a sufficient amount of these materials in the structure of the cable which it is desired to protect. However, in certain optical cable structures such as, for example, in plastic tubular elements containing optical fibres arranged loosely, the amount of material to be used is excessive and uneconomical and in these cases use is therefore made of conventional inert blocking materials. The possibility also exists that an undesired swelling of this water-swellable mass (even in the presence of small percentages of relative humidity) might give rise to attenuation phenomena of the signal transmitted, on account of the irregularly distributed pressures on the surface of the optical fibres, even under conditions which would otherwise not be harmful to the functioning of the cable.

In addition, as has been observed by the Applicant, optical fibres in contact with particulate material with particles larger than about 1 $\mu$m in size may be subject to microbending phenomena, as a result of which the insertion of elements such as strips or yarns containing water-swellable powders in direct contact with the fibres presents appreciable risks of increasing the attenuation, even independently of the presence of moisture.

In the case of optical fibre strips coated with a film of water-swellable material, described in U.S. Pat. No. 4,767,184, the Applicant has observed that if the water-swellable materials used tend to swell, even to a very small extent, in the presence of relatively low percentages of relative humidity, which in themselves would not be harmful to the optical fibres, this swelling can result either in irregular distribution of the pressure on the fibre coated with this material, or to excessive ringing of the optical fibre, both of which being drawbacks which can result in attenuation phenomena of the signal transmitted.

The Applicant has also observed that after it has expanded, a swelling material is not capable of correctly filling all the interstices inside the cable, in particular in the case where the spaces to be filled are of highly irregular shape, such as, for example, the star-shaped areas created by the winding of optical tubular elements the spaces between the optical fibres and the like. In this way, the risk remains that in these spaces, even after the swelling material associated therewith has reached the maximum possible degree of expansion, channels remain in the structure of the cable, although of reduced size, through which channels water can run freely.

In addition, complete swelling of the water-swellable materials typically requires a certain amount of time, during which the flow of water is not completely blocked and this can lead to a considerable length of cable affected by longitudinal penetration of water, in particular in the case where the empty fraction of the cavity involved is large.

Finally, any of the above solutions practised in the prior art implies the insertion of an additional element (such as powders, tapes, foils etc.) into the cable structure. This generally results in introducing additional steps into the cable manufacturing process, as well as in possible cumbersome operations while connecting cable's ends and/or repairing damaged portions of said cable.

SUMMARY OF THE INVENTION

According to the present invention, it has been found that a cable which has no elements of fluid or pulverulent type for blocking the flow of water can be made by combining the cavities present in this cable with a solid material capable of dissolving in the penetrating water to form, with this water, a solution which is sufficiently viscous to block or at least greatly impede this flow of water. In particular, said solid material can be advantageously formed into a structural element of the optical cable, such as a tube or a slotted core, apt to contain and protect optical fibres.

One aspect of the present invention thus relates to an optical fibre cable comprising a longitudinal cavity extending along the length of the cable, at least one optical fiber disposed inside said cavity and a solid and compact element associated with this cavity, characterized in that the said solid and compact element comprises a water-soluble polymer material which, following accidental ingress of water into the cable, is capable of forming an aqueous solution with a predetermined viscosity such as to block the flow of water within 10 meters of the point of ingress. Preferably, this solid and compact element comprises about 30% or more, preferably at least about 50%, of the said water-soluble polymer material. According to a particularly preferred embodiment, this solid and compact element is formed for more than about 75% of the said water-soluble polymer material.

Preferably, said aqueous solution has a viscosity of at least about $10^4$ cP (centipoise) at 20° C.

In a preferred embodiment, said solid and compact element is a structural element of the cable apt to contain and protect the at least one optical fibre disposed within said longitudinal cavity. According to a preferred embodiment, the said solid and compact element containing the at least one optical fibre is a tubular element and the said longitudinal cavity is defined by the inner volume of said tubular element. Preferably, said tubular element comprises a two-layer wall in which the inner layer is made from the said water-soluble solid material and the outer layer is made from a conventional water-insoluble polymer material. According to a further preferred embodiment, the said tubular element comprises a third outer layer made of water-soluble solid material. According to an alternative embodiment, the said tubular element is made from a single sheath of said water-soluble solid material.

According to an alternative embodiment, said structural element apt to contain the at least one optical fibre is a grooved core comprising at least one groove longitudinally disposed on the outer surface of said core and the longitudinal cavity is defined by the inner volume within said groove. According to an embodiment of the present invention, at least the walls of said groove are made from a water-soluble solid polymer material. According to an alternative embodiment, said grooved core is made completely from said water-soluble solid polymer material.

According to another alternative embodiment, the element made of water-soluble solid material included in a cable according to the present invention is a tape.

According to a further aspect, a cable according to the present invention comprises at least one sheath of polymer material arranged so as to form the said cavity and at least one solid element of water-soluble polymer material arranged inside this sheath, characterized in that in the presence of a relative humidity of greater than about 75% outside this cavity, the relative humidity inside this cavity is maintained below about 75% for a predetermined period of time. Preferably, the said predetermined period of time is at least twenty years.

A further preferred aspect of the present invention relates to a cable as defined above, characterized in that, in the presence of a relative humidity of substantially less than or equal to about 80%, the said water-soluble polymer material absorbs an amount of water of less than about 25% of the amount of water which can be absorbed by the water-soluble solid material under saturation conditions.

According to a preferred embodiment, the ratio between the cross section of the said cavity and the perimeter fraction of this cavity delimited by the abovementioned solid element made of water-soluble material is less than about 0.5 mm. Preferably, when the viscosity of the said aqueous solution is at least about $10^4$ cP, the ratio between the cross section of the said cavity and the perimeter fraction of this cavity delimited by the said solid element made of water-soluble material is less than about 0.4 mm.

According to a further preferred embodiment, the cross section of the solid element made of water-soluble material is not less than about 10% of the free cross section of the cavity with which the said element is associated, this cross section preferably being at least 20%, in particular up to about 40%, of the said free cross section.

According to a further preferred embodiment, a cable according to the present invention is characterized in that the water-soluble polymer material associated with the cavity of the said cable is also water-swellable. Preferably, this material swells by at least about 5% relative to the original volume, when placed in contact with water for about four minutes.

According to a preferred embodiment, the water-soluble polymer material of the solid element associated with the longitudinal cavity has a solubility in water of at least about 100 g/l. Preferably, the said material is capable of forming an aqueous solution with a viscosity of at least about $10^4$ cP at 20° C. Preferably, the said aqueous solution contains an amount of polymer material of between about 100 g/l and about 250 g/l.

Preferably, the said water-soluble polymer material contained in a cable according to the present invention has a breaking load of greater than about 15 Mpa and an elastic modulus of greater than about 100 Mpa.

According to a preferred embodiment, the said water-soluble polymer material contained in a cable according to the present invention is selected from the group consisting of polyacrylamide, modified polyvinyl alcohol, vinyl alcohol/vinyl acetate copolymers and polyvinylpyrrolidone, and mixtures thereof. Preferably, this material is a vinyl alcohol/vinyl acetate copolymer.

According to a particularly preferred embodiment, the said copolymer can be obtained by partial hydrolysis of the acetate groups of a polyvinyl acetate homopolymer. Preferably, the degree of hydrolysis of the acetate groups of the polyvinyl acetate homopolymer is between about 50% and about 95%, even more preferably between about 70% and about 90%.

Advantageously, the said vinyl alcohol/vinyl acetate copolymer has a viscosity index of greater than about 5. Preferably, the viscosity index of the copolymer is between about 8 and about 40, vinyl alcohol/vinyl acetate copolymers with a viscosity index of between about 10 and about 30 being most preferred.

For the purposes of the present invention, the expression solid, compact element is intended to refer to an element consisting of a material, or a mixture of materials, which, at the working temperatures of the cable (and in the near absence of water), is not fluid, fibrous or pulverulent, and has mechanical properties, such as elastic modulus, breaking load, elongation at break and the like, which are similar to those of conventional polymer materials employed to make the structural elements of the cable, such as, for example, cores, sheaths or tubular elements containing optical fibres. The term "conventional materials" is referred in the present description to those material typically employed in the art for manufacturing the above structural elements and comprise within its meaning, although not being limited to, polymer materials such as polyolefins, for example polyethylene (high, medium and low density PE), polypropylene (PP) or ethylene-propylene copolymers (PEP), polybutylene terephthalate (PBT), polyvinylchloride (PVC) or polyamides (PA).

The expression "solid element comprising more than about 75% of a water-soluble polymer material" is intended to mean that this solid element is made mainly of a water-soluble polymer material, with the optional addition of other minor components such as, for example, fillers, plasticizers, pigments, dyes, processing agents, biocides or stabilizers, present in an amount of less than about 25% by weight, preferably less than about 10%.

In the present description, the term water-blocking material, or water-blocking properties, is intended to refer typically to a material capable of blocking the longitudinal propagation of water inside the cable within a predetermined length of this cable. Preferably, this length is less than or equal to 10 meters.

The term "water-absorbing material" is intended to refer to a material which tends to absorb water from the surrounding environment.

In the present description, the term "water-swellable" or "swelling" material is intended to refer to a water-absorbing material which, when placed in contact with water, increases in volume, after absorption of a given amount of water, although remaining in the solid state. This increase in volume depends on the type of material, on the contact time of this material with the water and on the amount of water absorbed. This definition includes materials which, on contact with water, show a volume increase of at least 5% relative to the original volume, up to an increase of more than 100% relative to the original volume for substances with particularly high water absorption.

The term "water-soluble material" is intended to mean that the water-blocking material used in a cable according to the present invention is capable of at least partially dissolving on contact with water, creating an aqueous solution with a predetermined viscosity value. In particular, the viscosity of the solution which forms will be such that it hinders the flow of the said solution in the cable. Preferably, this solution has a viscosity such that it essentially blocks a flow of water which has penetrated into a cavity, within a distance of less than about ten meters from the point of ingress of the said water.

DETAILED DESCRIPTION

A better understanding of the present invention will be gained from the following detailed description with reference to the attached drawings, in which.

Figure 1:
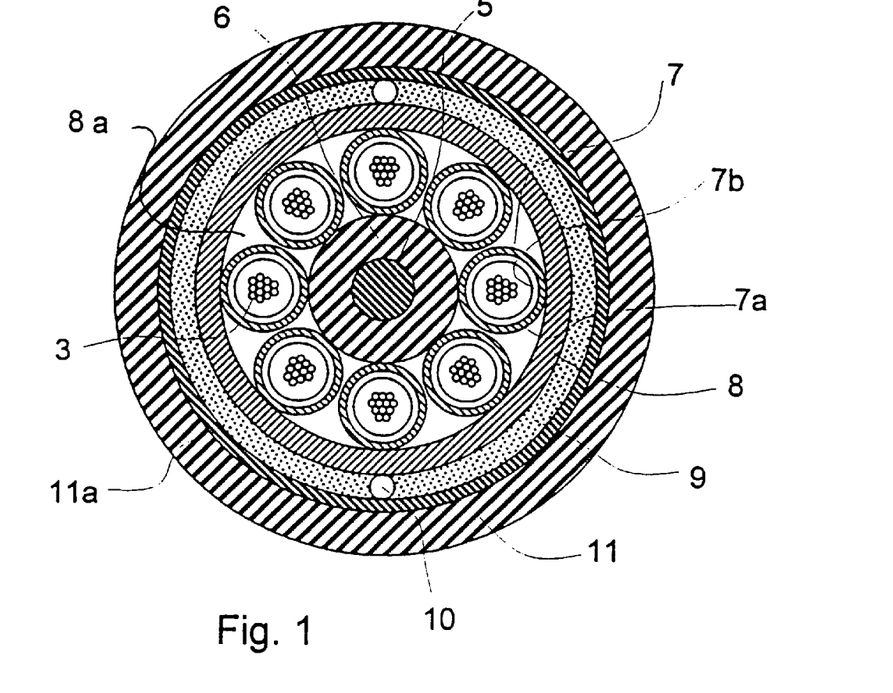
FIG. 1 is a schematic cross section of an example of an optical fibre cable according to the invention, of the type containing tubular element with a central support.

A cable of the so-called tubular element type (in particular of the loose tube type), as represented in FIG. 1, has, in the radially innermost position, a supporting element comprising a reinforcing element, typically made of glass resin (5), coated with a layer (6) of polymer, up to a given diameter.

The cable has one or more tubular elements or tubes (7), wound around the supporting element (5) and around its coating layer (6), inside which are located the optical fibres (3) arranged individually, or assembled in bundles, ribbons, mini-tubes (i.e. a micro-sheath surrounding a bundle of optical fibres) and the like.

The number of tubular elements present (which may also be arranged on several layers) and the dimensions of these tubular elements depend on the intended capacity of the cable, as well as on the conditions of use of this cable.

For example, cables are envisaged with only one tubular element (in which case the central element (5) and its coating (6) is not present), and cables are envisaged with six, eight or more tubular elements, wound in one or more layers (for example up to 24 tubular elements bundled on two layers).

The tubular elements (7) are in turn held together in a containing layer (8) made, for example, by wrapping, and are preferably combined with a reinforcing element (9), for example a layer of Kevlar® fibres or of glass yarn, the size of which depends on the mechanical strength requirements of the cable.

Two sheath-dividing filaments (10), arranged longitudinally with respect to the cable, can be included within the reinforcing layer (9).

Lastly, the cable comprises a protective outer sheath (11), typically made of polyethylene. In relation to specific requirements, further protective layers can also be present, for example of metal layers, either inside or outside the structure described.

According to one illustrative embodiment of the present invention, in a cable with the structure described above, the tubular elements (7) can be made with a double-layer wall, in which the inner layer (7b) is made from a solid material with water-blocking properties and the outer layer (7a) is made from a conventional material such as polybutylene terephthalate (PBT), polypropylene (PP), polyethylene (PE) or ethylene-propylene copolymer (PEP).

Figure 2:
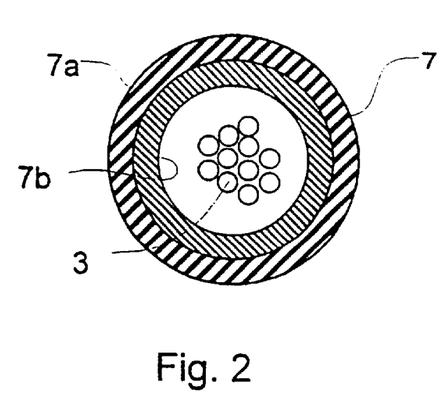
FIG. 2 is a cross section of a tubular element of a cable according to the invention, with a two-layer coating containing optical fibres.

FIG. 2 shows a tubular element (7) with a two-layer wall (produced, for example, by co-extrusion), the outermost of which (7a) is made from a conventional polymer material (e.g. PE, PP, PEP or PBT) while the innermost (7b) is made from a solid water-soluble polymer material. The space inside the tube, not occupied by the optical fibres, is typically empty.

One or more optical fibres (3) are arranged inside the tubular element, typically loosely, separate or assembled in the form of fibre ribbons, mini-tubes or the like.

The material forming the inner layer (7b) of the tubular element is a solid extrudable material with mechanical properties more or less similar to those of the outer layer (7a), such that, preferably, the thickness of the entire tubular element is not dissimilar to the typical thickness of a tubular element with a single conventional layer.

Typically, for example, a tubular element with an outside diameter of 3 mm can have a wall with a total thickness of about 0.6–0.7 mm, divided in almost equal parts between the inner water-soluble layer (7b) and the outer conventional layer (7a).

Figure 3:
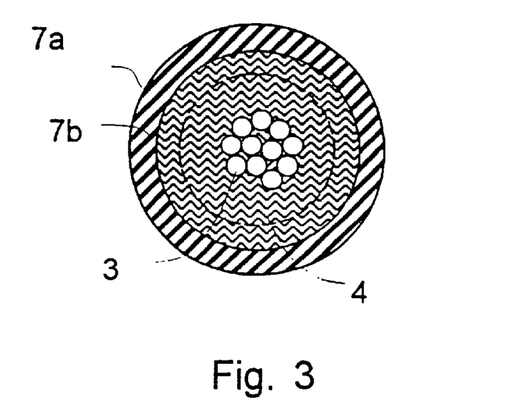
FIG. 3 is the same cross section of the tubular element as FIG. 2, after the ingress of water.

In the case of accidental ingress of water, the water-soluble polymer material of the inner layer (7b) of the two-layer tubular element dissolves at least partly in the penetrating water, starting from the original position (represented by the dashed line in the figure), as shown in FIG. 3, forming a viscous solution (4) which moves between the fibres, thus filling the free spaces (generally of irregular outline), independently of their shape, until the entire free cross section of the tubular element has been occluded.

By means of an appropriate choice of the properties of the water-soluble material of the layer (7b), the aqueous solution thus formed has a viscosity which is sufficiently high to hinder the subsequent propagation of water along the cable, until this propagation is blocked within a few meters from the point of ingress of the water.

In this way, without introducing additional materials into the tubular element, such as powders, blocking fluids and the like, which would involve, inter alia, a substantial increase in the weight of the cable, blockage of the propagation of water which has accidentally penetrated into the cable is obtained.

In addition to the free cross section inside the tubular elements (7), the cable structure described above comprises areas (8a) outside the tubular elements, usually described as star-shaped areas, through which water which has accidentally penetrated into the cable can pass.

According to the present invention, the polymer layer (6) for coating the central element (5) is advantageously made, totally or in an outer layers, of a solid water-soluble material which has the properties mentioned above.

This coating layer (6) can be made either by extrusion (co-extrusion in the case where a more internal layer of conventional type and a more external layer of solid water-blocking polymer material are provided), or by applying a compact tape (longitudinal or helical) of solid, water-blocking polymer material over the central element (5) (which may optionally already be partially coated).

Where appropriate, an outer layer of the tubular elements (7) can also be envisaged to be of water-blocking material, or alternatively the entire tubular element can be made of water-blocking material.

If desired, the containing layer (8) according to the present invention, can be made (entirely or partly) by wrapping with a compact tape of solid, water-blocking polymer material, or alternatively with an extruded layer of the same material.

The presence of layers of solid, water-soluble polymer material in the layers (6) and (8) and the size of the said solid, water-soluble polymer material present in these layers are determined by the free cross sections present (for example the star-shaped areas (8a) mentioned above) and by the requirements for blocking the flow of water in the cable in more or less narrow spaces.

In turn, the reinforcing layer (9) can comprise filaments or rods of solid, water-soluble polymer material of the type mentioned above.

In addition, or as an alternative to the rods or filaments which may be included in the reinforcing layer (9), the sheath (11) can be formed of two layers, comprising an inner layer (11a) made of solid, water-soluble material.

Based on the principles mentioned above, the present invention can also be applied to a cable with a grooved core.

Figure 4:
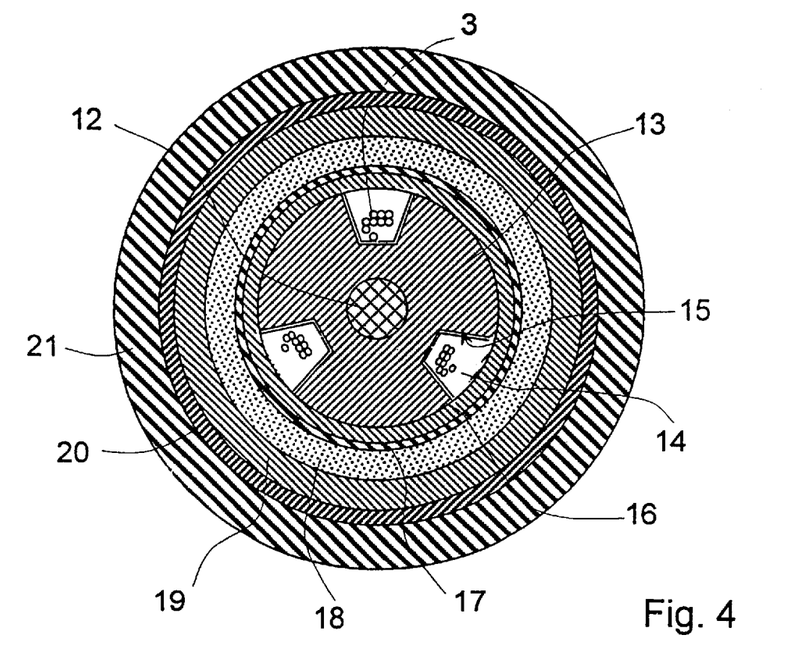
FIG. 4 is a schematic cross section of another example of an optical fibre cable according to the invention, of the type with a grooved core.

A cable with a grooved core, as reported in FIG. 4, has, in the radially innermost position, a reinforcing element (12) made, for example, of glass resin, on which is present a grooved core (13) (which is typically extruded), made of a solid, water-soluble material according to the invention. The grooves (14) extend in a continuous helix or in an alternating s-z path all the way along the entire outer surface of the said core, in order to house the optical fibres (3) therein; in a similar manner to that mentioned above, the optical fibres (3) can be arranged individually or assembled in ribbons, mini-tubes and the like, loosely (i.e. with an excess of length) or tightly at the bottom of the grooves.

Figure 4A:
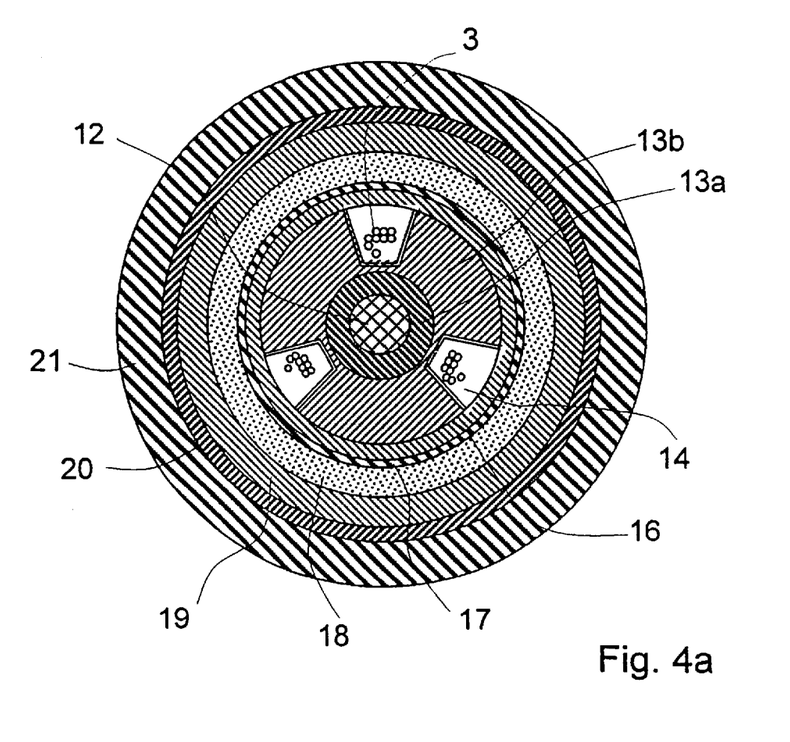
FIG. 4a is an alternative embodiment of a cable depicted in FIG. 4.

According to an alternative embodiment, said grooved core can be made only in part from the water-soluble polymer material, as shown in FIG. 4a. In this case, a double layer grooved core is manufactured (e.g. by double-extrusion or co-extrusion of the two polymer layers), wherein the inner portion (13a) of the core is made from a conventional polymer material (e.g. PE or PP) and the outer grooved portion (13b) is made from a water soluble material according to the invention.

Alternatively, the grooved core (13) can be made entirely from a conventional material, such as PE or PP. In this case, special U-shaped elements (15) made of water-soluble material can be placed in its grooves, it being possible, for example, for these elements to be co-extruded with the grooved core or produced separately and subsequently inserted into the grooves.

As an example, the grooved core can be between 4 and 12 mm in diameter and can comprise from 1 to 10 grooves, depending on the capacity of the desired cable. The dimensions of the grooves themselves are determined by the number of fibres present therein (which may be assembled as tapes of fibres) and by the degree of freedom envisaged for these fibres.

The grooved core (13) is then coated with a layer (16) of polymer, preferably consisting of solid, water-soluble material, which closes off the grooves; this coating can be made either in the form of an extruded sheath or as a longitudinal or helical wrapping.

This layer can in turn be surrounded by a further reinforcing tape (17) made, for example, of polyester, and is then surrounded by a reinforcing layer or armouring made, for example, of Kevlar® (18), which can incorporate filaments or rods made of solid, water-soluble material.

A further wrapping (19) made, for example, of polyester surrounds the armouring (18) and is itself encircled by an outer sheath (21) typically made of polyethylene; a layer of solid, water-soluble material (20) can be placed under the outer sheath (21) and in all of the zones which can conceivably be reached by water.

As mentioned above, for the purposes of the present invention, a solid and compact element comprising a solid, water-soluble material must be such that, at the working temperatures of the cable (and in the substantial absence of water), it is not fluid, fibrous or pulverulent, and has mechanical properties, such as elastic modulus, breaking load, elongation at break and the like, comparable to those of the materials used to make the elements of the cable. Accordingly, optical cable elements made from the said material can advantageously replace one or more structural elements of an optical cable (e.g. covering sheaths, tubes, grooved cores, etc.) which are typically made from conventional polymer materials. At the same time, the water-solubility properties of this material must be such as to form an aqueous solution of sufficient viscosity, so as to block the flow of water under the conditions envisaged. In particular, the properties outlined above will also be such in the preferred case in which the said solid element is made essentially (i.e. for more than about 75%) of a water-soluble polymer material.

In addition, a water soluble material according to the invention should preferably be easily extrudable into one of the above mentioned solid and compact elements.

The solid and compact element associated with the longitudinal cavity within which it is desired to block the flow of water will comprise at least 30% by weight, and preferably at least 50% by weight, of water-soluble polymer material. This solid element with a water-blocking function can thus contain, besides the abovementioned water-soluble polymer material, other materials which can advantageously be mixed with this water-soluble polymer, such as, for example, other compatible polymer materials or conventional polymer additives, such as filling materials, e.g. carbon black or inorganic fillers (for example calcium carbonate or magnesium hydroxide), stabilizers, pigments or dyes and plasticizers. According to a preferred embodiment, this solid and compact element consists essentially, i.e. for more than about 75% by weight, of a water-soluble polymer material, the remaining portion of the composition being represented by conventional additives for polymeric compositions. Preferably, at least 5% of the total weight of the composition is a plasticizer.

The Applicant has observed that, in a cable according to the present invention, as the viscosity of the solution formed from the water-soluble material increases, it is possible to increase the dimensions of the cavity within which the blocking of water must take place and/or reduce the time taken to block this flow of water.

In particular, the Applicant has observed that in order to adequately block the passage of water, it is particularly advantageous to use a polymeric water-soluble material which forms aqueous solutions which reach viscosity values of about $10^4$ cP (centipoises), measured at a temperature of 20° C. with a Höppler falling-sphere viscometer, preferably of between $10^4$ and $10^5$ cP.

To this end, it is necessary for a sufficient amount of the water-soluble material of the layer (7b) to dissolve in water and for the solution thus formed to have the required viscosity.

It has been observed, during tests of propagation of water along tubular elements containing optical fibres consisting of various water-blocking and water-soluble materials according to the invention, in the case of water-soluble polymers which form solutions with viscosities of about $10^4$ cP, that in order to block propagation within the first ten meters of tubular elements (and within a few minutes) the ratio between the cross section of the cavity available for the advancing vein of fluid (in mm$^2$) and the fraction of its perimeter consisting of water-soluble material (in mm) (both measured in the absence of water) needs to be less than or equal to about 0.3 mm.

In the case of solutions with a viscosity of about $10^5$ cP, this ratio can increase to about 0.4–0.5 mm.

Advantageously, in order to reach the desired viscosity values, polymer materials are used whose aqueous solutions have a viscosity of about $10^4$ cP at concentrations of between about 100 g/l and about 250 g/l measured at 20° C., preferably between about 120 g/l and about 200 g/l, those which form solutions with viscosities of about $10^4$ cP at concentrations of between about 130 g/l and 180 g/l being particularly preferred.

For the purposes of the present invention, water-soluble polymer materials which have a solubility in water at 20° C. of at least 100 g/l, preferably of least 200 g/l are thus preferred, materials with a solubility of about 300 g/l or more being particularly preferred.

The Applicant has moreover observed that some of the water which interacts with the water-soluble polymer to form the solution of desired viscosity is incorporated into the said polymer, giving rise to partial swelling of this polymer. Typically, it has been observed that, within the typical times for blocking or substantial slowing down of the flow of water, these water-soluble polymers can absorb from about 10% to about 25% by weight of water, with consequent swelling by about 5–10% of their original volume. This swelling of the polymer, although limited, can nevertheless contribute towards reducing the cross section for the passage of water, thus making it easier for the high-viscosity polymer solution formed to block the flow. After this, further contact of the polymer with the water present can result in further swelling of the polymer, thus further restricting the cross section for the passage of water, thereby increasing the polymer solution's blocking efficacy. Among the water-soluble polymer materials which can advantageously be used in a cable according to the present invention, the preferred ones will thus be those with water-swellable properties, i.e. capable of incorporating a certain amount of water inside them, giving rise to appreciable swelling within the desired times, typically of at least 5% after about 4 minutes of contact with water, these materials thus being capable of contributing towards the blocking of the flow of water by the polymer solution.

In view of the above observations, taking the case of a solid element consisting essentially of a water-soluble polymer material, and assuming total dissolution of this polymer material in the penetrating water, it can be calculated that the amount of material present per unit of length has to be such that it occupies at least about 10% of the free cross section of the cavity through which the water can flow, so as to form a solution with a concentration which is sufficient to obtain the desired viscosity. For example, in the case of a tubular element with an inside diameter of about 2 mm (cross section of about 3.14 $mm^2$), an amount of water-soluble material can be used such that it occupies a cross section of at least about 0.314 $mm^2$. This material may then be placed inside the cavity, for example, as a solid filament 0.63 mm in diameter or as a polymer film placed, preferably extruded, on the tubular element's inner surface, to about 0.05 mm thickness. If one or more optical fibres are found inside the tubular element, the free internal cross section of this tubular element will be less, thus making it possible to further limit the amount of water-soluble material to be used.

On the other side, since, in some cases, a concentration of material of up to 250 g/l may be required in order to achieve the desired viscosity, it may be preferable to increase the amount of water-soluble material per unit of length of the cable. Typically, it is thus advantageously possible to use an amount of water-soluble material which is such that it occupies at least about 20% of the free cross section of the cavity in which the water can flow, up to an amount which is such that it occupies about 40% of the free cross section. A further increase in the amount of water-soluble material may be envisaged for specific cable designs in which a larger amount of water-blocking material is desirable.

The Applicant has moreover observed that a number of the water-blocking materials chosen to make a cable according to the present invention form an aqueous solution which substantially increases its viscosity over time, until a gel is produced which further contributes towards maintaining the water-blocking condition over time.

The Applicant has observed that in order to obtain the desired solubility, it is preferable for the water-soluble polymer not to be crosslinked, such that the various macromolecules are relatively independent of each other, to allow the water to dissolve sufficient amounts of polymer material.

Among the solid, water-soluble materials which can be used in a cable according to the present invention, the preferred ones are those which, up to relatively high relative humidity (R.H.) values, typically about 75–80%, absorb only modest amounts of water, typically less than about 25% by weight of the amount which can be absorbed by the material under saturation conditions (R.H.=100%).

For example, when placed in an atmosphere at about 75% R.H., materials used in a cable according to the invention show a weight increase (due to the absorption of water) of about 10% even after testing for more than 1000 hours. When placed in an atmosphere with an R.H. value of 100%, the same materials show weight increases of about 30% by weight after testing for only about 100 hours, reaching increases of greater than 60% after testing for about 800 hours.

This property of the material is particularly advantageous since, as the optical fibres are relatively insensitive to the presence of water vapour up to relative humidity values of less than about 75–80%, below these values it is advantageous for the water-soluble material to be more or less unchanged.

The fact that the material is virtually insensitive at these relatively low relative humidity values allows better processability and fewer problems of storage of the finished product, since it is not necessary to protect it against ambient humidity, which is generally less than 75%.

In addition, by virtue of this property, the material remains almost entirely available to block water in the event of an ingress of liquid water or an increase in the relative humidity beyond the critical threshold, without any part of this material having needlessly interacted with the water in the vapour state below the critical threshold for the relative humidity, or even needlessly undergoing swelling so as to result in any undesired squeezing of the optical fibres.

The Applicant has moreover observed that, among the water-blocking and water-soluble materials which can be used in a cable according to the present invention, it is particularly advantageous to use materials which, when placed in a housing which contains optical fibres, give this housing hygrostatic properties. The reason for this is that when the environment outside the cable structure in which the optical fibres are housed (for example a tubular element of plastic material) exceeds the relative humidity critical threshold (75–80%), a material according to the present invention placed inside the cable structure in an adequate amount is capable of maintaining, around the optical fibres, relative humidity values which are less than the critical values.

For example, when conventional tubular elements for containing optical fibres, made of e.g. polybutylene terephthalate (PBT), polypropylene (PP) or polyethylene (PE), are in an atmosphere with a high relative humidity (for example 95%), the external humidity tends to permeate towards the centre these tubular elements in which the optical fibres are housed; under these conditions, relative humidity values of greater than 80% are reached inside the tubular elements within a few months, with the possibility of the drawbacks mentioned above taking place.

If, on the other hand, such a containing tubular element has a two-layer structure according to the present invention, in which the outer layer is made of a conventional polymer material and the inner layer is made of a water-absorbing material with the properties mentioned, it has been observed that the relative humidity inside the tubular element rises much more slowly than in the case of tubular element made entirely of conventional material.

If, moreover, this tubular element is in turn contained in a container sheath made of a polymer of conventional type, the relative humidity inside the tube can remain below the critical threshold for as much as 20–25 years, which corresponds to the expected average lifetime of an optical cable.

Similar behaviour is also found if the tubular element containing the optical fibres consists of a single layer of water-soluble material and the tubular element is in turn housed in a container sheath made of conventional polymer material.

The presence inside the cable structure of further elements made essentially of the water-soluble material of the invention, such as, for example, interstitial tapes or filaments (or other elements described in greater detail in the description hereinbelow), can further increase the time taken to reach the relative humidity critical threshold.

According to the present invention, polymers which can advantageously be used as water-blocking materials are typically polymers which are solid at room temperature (or at the working temperatures of the cable), which can be extruded or processed in some other way, capable of dissolving in water to form a solution of sufficient viscosity. Preferably, these materials show reduced absorption of water in the presence of relative humidity values of less than about 75–80% and/or have hygrostatic properties with respect to the cavity in which they are contained or with which they are associated.

These polymers typically comprise within their structure one or more hydrophilic groups such as those mentioned below:

hydroxyl group (—OH)
ether group (—COC—)
ester group (—CO—O—)
amine group (—NH$_2$)
carboxylic group (—COOH)
amide group (—CO—NH—).

Examples of these polymers are polyacrylic acid, polyacrylamide, polyacrylamide/acrylic acid copolymers, methacrylic acid, povinylpyrrolidone and polymers derived from polyvinyl alcohol, such as esterified or etherified copolymers of polyvinyl alcohol and, in particular, vinyl alcohol/vinyl acetate copolymers.

Among the abovementioned materials, it is preferred to use polyacrylamides, modified polyvinyl alcohol, vinyl alcohol/vinyl acetate copolymers or polyvinylpyrrolidone.

The term modified polyvinyl alcohol includes, but is not limited to, the following polymers obtained:
a) by partial etherification of a polyvinyl alcohol (for example by epoxidation by introducing groups such as —(CH$_2$CH$_2$—O—)$_n$—OH) into the PVA homopolymer chain;
b) by partial esterification of alcohol groups (similarly, a suitable polyester homopolymer can be hydrolysed in order to introduce hydroxyl functions therein); or
c) by block copolymerization thus obtaining, for example, poly(vinyl alcohol-co-polyoxyethylene) from vinyl acetate, polyoxymethylene monomethyl ether and using a diisocyanate or a diepoxide as chain extender.

For the purposes of the present invention, a vinyl alcohol/vinyl acetate copolymer (referred to hereinbelow as VA-VAc copolymer), which can be obtained by partial hydrolysis of the acetate groups of a polyvinyl acetate (PVAc) homopolymer, is particularly preferred.

In particular, the degree of hydrolysis of the PVAc homopolymer is between about 50% and about 95%, preferably between about 70% and about 90%.

As regards the degree of hydrolysis of the copolymer, the Applicant has observed that, for a zero degree of hydrolysis (i.e. for polyvinyl acetate homopolymer), the solubility in water is very modest, equal to about 0.01 g/liter at 20° C.

As the degree of hydrolysis increases, the hydrophilic properties of the material increase, along with its solubility, to about 300 g/l for a degree of hydrolysis of about 88%. However, applicant has noticed that a further increase in the degree of hydrolyis results in a corresponding decrease in the solubility of the material in water. In point of fact, in the case of complete hydrolysis of the acetate groups, the polyvinyl alcohol homopolymer obtained has an extremely low solubility(1.43 g/liter at 20° C.), even though the material is still highly hydrophilic.

For the purposes of the present invention, it is thus preferred to use a VA-VAc copolymer with a degree of hydrolysis which is incomplete, so as to ensure good solubility of this polymer in water, and which is sufficiently high, such that the polymer's hydrophilic properties are sufficient to ensure an adequate degree of interaction with water.

The Applicant has moreover observed that, besides the degree of hydrolysis of the PVAc homopolymer, one variable capable of influencing the water-blocking behaviour of the material is the molecular weight of the VA-VAc copolymer, in particular the viscosity index of the polymer.

The viscosity index of a polymer is defined here as the ratio between the viscosity of an aqueous 4% solution of the polymer (measured at 20° C. on a Höppler falling-sphere viscometer) and the viscosity of water (measured at 20° C. on a Höppler falling-sphere viscometer); for an equal degree of hydrolysis of the polymer, this viscosity index is proportional to the molecular weight of the polymer. Typically, for an equal viscosity index, as the degree of hydrolysis of a VA-VAc copolymer increases, its molecular weight decreases.

As a matter of fact the Applicant has observed that VA-VAc copolymers with low viscosity indices react faster in the presence of water, absorbing larger amounts of water and swelling more rapidly than copolymers with a higher molecular weight.

Moreover, it has also been observed that aqueous solutions of polymers with too low a viscosity index do not quickly enough reach a viscosity which is such as to effectively block the longitudinal propagation of water. According to the Applicant, this is probably due to the fact that, although these copolymers have a relatively high solubility in water (in some cases even higher than that of polymers with a similar degree of hydrolysis and a higher MW), in order to reach the desired viscosity the concentration of polymer in solution needs to be sufficiently high, typically at least 30% by weight. Thus, the increased amount of polymer which needs to be dissolved involves an increase in the time to form the solution having the desired viscosity, and consequently an increase in the length of cable affected by the movement of water before it is blocked.

The Applicant has also observed that if the viscosity index of the polymer used is too low, then, in the presence of relative humidity values of less than 75–80%, the surface of this polymer may become covered with a sticky coat caused by the partial absorption of water. This surface stickiness is generally not wanted since, besides the problems associated with the difficulty in handling this material under these conditions, any contact of this surface with the optical fibres may result in attenuation phenomena.

On the other hand, the Applicant has observed that VA-VAc copolymers with a sufficiently high viscosity index are capable of forming, relatively rapidly, a solution with a sufficiently high concentration (for example between 10% and 20% by weight) having the viscosity needed to block the flow of water within the desired times.

Moreover, in the presence of relative humidity percentages of less than 75–80%, these copolymers do not show any phenomena of surface stickiness caused by the partial absorption of water, as may be found, however, for copolymers of low molecular weight.

However, VA-VAc copolymers with an excessively high viscosity index can have an excessively low speed of dissolution on contact with water, as a result of which the water can flow-for an excessive distance (for example many meters) inside the cable before being blocked.

The Applicant has thus found that vinyl alcohol/vinyl acetate copolymers with a viscosity index of greater than about 5 are particularly suitable for the purposes of the present invention. Preferably, the viscosity index of the copolymer is between about 8 and about 40, vinyl alcohol/vinyl acetate copolymers with a viscosity index of between about 10 and about 30 being still more preferred. Advantageously, it is possible to use mixtures of copolymers with different molecular weights, so as to combine the specific advantageous effects of each copolymer.

Examples of commercially available materials with the desired properties are those sold under the trade name Mowiol® (Hoechst AG), Gohsenol® (Nippon Gohsei), Elvanol® (Du Pont) or Airvol® (Air Products).

In order to evaluate a water-soluble polymer material which can be used in a cable according to the present invention, the Applicant has developed two simple experimental tests.

A first test consists in producing, by extrusion, a tubular element with an outside diameter of 3 mm, with a double layer of coating and containing 11 optical fibres 250 $\mu$m in diameter, consisting of an outer layer of polyethylene of about 0.35 mm in thickness and an inner layer of water-soluble polymer material of about 0.3 mm in thickness. This tubular element is connected to a water tank placed under a head of 1 meter of water. The Applicant has observed that water-soluble polymer materials which are particularly suitable for producing a cable according to the invention are those capable of blocking the flow of water within 10 meters of the point of ingress.

According to a second test, plates of water-soluble material (about 20×30×1 mm in size) are moulded and are immersed in a volume of about 1 liter of water for a defined period of time. Once in contact with the water, some of the polymer material dissolves and is carried into solution, some of the material forms a high-viscosity solution on the surface of the plates and some of the material remains in the solid state, partially swelling after absorption of water. The plates are then removed from the water and shaken gently to eliminate the surface water. The viscous solution on the surface is removed, for example using a spatula, and its viscosity is measured. The Applicant has found that polymer materials which are particularly suitable are those capable of forming, on the surface of these plates, a solution with a viscosity of about $10^4$ cP or mere after immersion in water for about four minutes.

The water-soluble polymer material can be used in many different ways in the various components which form the structure of the cables, so as to optimize the water-blocking effect.

Besides using the water-soluble material to make portions of or replace the structural elements of the cable, so as to give this cable water-penetration-blocking properties without increasing its weight as described above, it is possible to exploit the water-soluble material's properties of being effective in blocking the penetration of water even into cavities of irregular shape, without introducing fluid, sticky or pulverulent materials into the cable, by introducing additional elements made of this same material.

For example, thin filaments of water-soluble material (for example with a diameter of $\leq 0.5$ mm) can be prepared, around which are wound bunches of optical fibres or which are wound together with the bunches around a central support, or alternatively suitable rods of appropriate dimensions to be inserted into the star-shaped areas (8a) or into the grooves (14) during construction of the cable.

In addition, it is also possible to make optical cables with other geometries such as, for example, mini-tube cable, in which two or more optical fibres are contained in a microsheath (of about 0.07–0.15 mm thickness) which can advantageously be formed from the water-soluble material according to the invention, a number of such mini-tubes being in turn housed into a larger diameter buffer tube. In addition also cables with a so-called tight core can be manufactured, in which the optical fibres are incorporated in a polymer core, in which the core is partly or totally made of the water-soluble material.

It is particularly advantageous to make the optical fibre housing from water-soluble material, such that its dissolution brings it into contact with the optical fibres, thus blocking the flow of water along the cavity in which these fibres are housed.

Such a structure makes it possible to produce a cable which is more or less free of conventional blocking materials, consisting of greasy or oily or pulverulent material in contact with the fibres.

However, with regard to the specific structural and working properties, it is also possible according to the present invention to combine portions of cable formed from or coated with a water-soluble material, with other portions containing blocking grease or a tape comprising water-swellable powder.

According to one aspect of the present invention, the viscous solution formed following the accidental ingress of water into the cable fills the interstitial spaces, thus blocking the flow, without the fibres experiencing any significant mechanical stresses.

This allows the cable, following accidental ingress of water, to nevertheless remain functional without experiencing any particular drawbacks in terms of attenuation of the signal, thereby allowing its repair to be carried out at a later time.

The manufacturing of the various elements mentioned above, made from or incorporating the water-soluble material, can be carried out according to the known techniques, preferably by extrusion.

In particular, the material can be either extruded directly as part of the cable structure (for example one-, two- and three-layer tubular elements for containing the optical fibres, the inner layer of the cable container sheath, the extruded coatings of the grooved core) or as a separate element to be inserted subsequently into the cable structure (for example filaments to be wound with the optical fibres, rods to be wound with the tubes, tapes, etc.).

For this purpose, it is preferable to add to this material a certain amount of plasticizer, in order to improve its processability and its final flexibility. The amount of plasticizer can range from about 1% to about 30% by weight of the water-blocking material, preferably from about 5% to about 25%, an amount of from about 15–20% by weight being particularly preferred. Examples of suitable materials which can be used as plasticizers are glycerol, sorbitol, trimethylolpropane, low molecular weight polyglycol, such as polyethylene glycol (e.g. di- or tri-ethyleneglycol), pentaerythritol, neopentylglycol, triethanolamine, oxyethylated phosphoric esters and water.

The Applicant has moreover observed that the presence of a plasticizer, in particular glycerol, preferably in the amounts indicated above, is capable of increasing the water-soluble material's water-absorption capacity.

The mechanical properties of the water-soluble polymer material (such as, for example, elastic modulus, breaking load, elongation at break, etc.) are chosen as a function of the specific use of the element inside the cable structure. These properties can be obtained by appropriately selecting the material with the desired properties or, for example, by appropriately varying the amount of plasticizer added to the polymer material, in order to modify its mechanical properties according to the specific requirements.

For example, as the polymer material can be used to make the entire wall of an optical fibre container tubular element or to replace a portion of the thickness of this wall, or alternatively a compact wrapping tape or other components of the cable structure, said material will preferably have mechanical properties similar to those of the conventional materials (PBT, PP, PE) used to make these elements, in order to withstand the typical stresses to which these elements are subjected.

EXAMPLE 1
Absorption of Water in the Vapour State

Using VA-VAC copolymers sold under the trade name Mowiol (Hoechst AG), 10 plates 1 mm in thickness were prepared. Table 1 gives the viscosity indices and the degree of hydrolysis of the polymers used and the plasticizer content in the mixture.

TABLE 1 properties of the water-blocking materials

| | VA-VAc copolymer Mowiol ® | | | |
|---|---|---|---|---|
| Test No. | Viscosity index | Degree of hydrolysis % | % by weight | Glycerol % by weight |
| 1 | 3 | 83 | 100 | 0 |
| 1a | 3 | 83 | 95 | 5 |

TABLE 1-continued properties of the water-blocking materials

| | VA-VAc copolymer Mowiol ® | | | |
|---|---|---|---|---|
| Test No. | Viscosity index | Degree of hydrolysis % | % by weight | Glycerol % by weight |
| 1b | 3 | 83 | 90 | 10 |
| 2 | 23 | 88 | 100 | 0 |
| 2a | 23 | 88 | 95 | 5 |
| 3 | 10 | 74 | 100 | 0 |
| 3a | 10 | 74 | 95 | 5 |
| 4 | 40 | 88 | 100 | 0 |
| 4a | 40 | 88 | 95 | 5 |
| 4b | 40 | 88 | 90 | 10 |

Weighed samples with dimensions of 20×70×1 mm to be subjected to a water-absorption test were obtained from the plates conditioned for 7 days under ambient conditions (23° C., 40% relative humidity).

The test was carried out according to the method prescribed by ASTM D 570, with the difference that the samples, instead of being immersed in water as indicated in that standard, were exposed to an atmosphere with a controlled relative humidity (RH) of 100% (value considered to be harmful to optical fibres) in one case, and of 75% (value not considered to be harmful) in the other case. The results are given in Table 1a below.

TABLE 1a

Tests of absorption of water in the vapour state

| | % $H_2O$ absorbed over time (hours) | |
|---|---|---|
| Test No. | At 100% RH | At 75% RH |
| 1 | 33% 264 h | 9.9% 264 h |
| 1a | 43% 264 h | 12% 264 h |
| 1b | 53% 264 h | 14% 264 h |
| 2 | 47% 1400 h | 11% 1400 h |
| 2a | 70% 1400 h | 14% 1400 h |
| 3 | 49% 1400 h | 7% 1400 h |
| 3a | 76% 1400 h | 13% 1400 h |
| 4 | 38% 360 h | 9% 360 h |
| 4a | 55% 360 h | 13% 360 h |
| 4b | 68% 360 h | 16% 360 h |

From these data, it is seen that the test materials show limited water absorption up to 75% RH, whereas this absorption is increased considerably at 100% RH.

It is also seen that by increasing the viscosity index, the absorbing capacity of the polymer increases; moreover, it is observed that the amount of water absorbed (both at saturated and at 75% R.H.) is increased by the presence of glycerol as plasticizer.

EXAMPLE 2
Measurement of the Hygrostatic Capacities

One plate was moulded from granules of commercial VA-VAc copolymer hydrolysed to 80% from the company Aldrich and a viscosity index of about 25, and 1 plate was moulded from MDPE, both to a thickness of about 0.2 mm.

Two discs were obtained from the MDPE plate, these having a working surface of 16 cm², which were used to close off, by means of suitable fittings, the open apertures of two 30 cm³ cells for testing water permeability according to ASTM E96, modified by inserting into each cell a Panametrics Hybrid-Cap sensor for measuring the relative humidity (sensitivity of about 2 mV/% RH) and inserting the wiring for this sensor through a hermetic slot.

The cells were assembled in a glove bag flushed with dry air (RH<1%). One of them, which served as a reference, was empty and contained only the sensor, the other also contained, along with the sensor, a portion of about 1 g of VA-VAc copolymer. This amount is proportional to the content envisaged in a typical cable according to the invention, comprising a two-layer tubular element (0.2 mm PE outer layer and 0.15 mm water-blocking copolymer inner layer) and a strip of water-blocking copolymer with a thickness of about 0.15 mm, for a total of about 30 g/m of water-soluble material.

The assembled cells, with the sensors supplied and connected to a data logger, were then removed from the glove bag and placed in a sealed container in which a relative humidity of 100% was maintained.

The results are given in Table 2 below.

TABLE 2

Hygrostatic capacity

| | RH in the container | |
| --- | --- | --- |
| Hours | with polymer | empty |
| 0 | 7% | 7% |
| 1000 | 35% | 65% |
| 2000 | 40% | 77% |
| 4000 | 50% | 90% |
| 5500 | 56% | 100% |
| 6500 | 60% | 100% |
| 8500 | 65% | 100% |

From these data it is seen that, after water has permeated through the MDPE discs, the relative humidity in the two cells increases over time from the initial value of about 7%.

However in the case of the cell containing the VA-VAc copolymer in the proportion envisaged, the relative humidity value rises slowly to 60% after 6500 hours, whereas in the case of the empty cell it increases more quickly, until it exceeds, at the end of 2000 hours, the danger threshold of 80% relative humidity and reaches 100% at about 5500 hours.

On the basis of the change of the curve for the cell containing the water-soluble copolymer, it was estimated that after 20 years, the relative humidity will reach a value of about 75%.

Based on the experimental results obtained, it is considered that this test is a true representation of the situation for a cable, with an acceleration factor of 10 due to the reduced thickness (0.2 mm instead of the conventional 2 mm) of the MDPE outer sheath.

From this test, it may thus be considered that in a dielectric cable containing elements made of solid, water-soluble material in an amount of about 30 g/m, immersed in water at ambient temperature, the internal relative humidity after about 9 years is still 60%, and reaches 75% only after 20 years, whereas in the case of an identical cable of traditional type, the relative humidity exceeds the 80% critical threshold already after 3 years.

EXAMPLE 3
Capacity for Blocking the Penetration of Water in Tubes

Using the commercial Mowiol VA-VAc copolymer, a number of mixtures were prepared in a dry-blender, with which two-layer tubular elements were extruded in the configuration in FIG. 1, with an inside diameter of 1.7 mm and an outside diameter of 3.0 mm, an average VA-VAc copolymer thickness of 0.3 mm as inner layer, the remainder being made of LDPE, and containing 11 optical fibres.

The tubular elements were then subjected to a test of longitudinal penetration of water.

The test was carried out according to the method provided in standard EIA/TIA-455-82B, with the difference being that the length of tubular element used was 10 m.

The results obtained (average of 3 tests) were as follows:

TABLE 3

Longitudinal penetration of water into a tubular element

| Test* | Water penetration (m) |
| --- | --- |
| 1a | >10 m |
| 2a | 7 m |
| 3a | 4 m |
| 4a | ~4 m |
| 4b | 4 m |

*the characteristics of the polymers used in the various tests are as given in Table 1

Three penetration tests were then repeated on the tubular element according to mixture 3a, giving an average value of 3.75 m, which is in good agreement with the above tests.

The tests confirmed that the two-layer tubular elements without blocking material, using VA-VAc copolymer as solid, water-soluble material for the inner part (in particular those with a viscosity index of greater than 3) are capable of impeding the longitudinal propagation of water in the case of accidental ingress, blocking this propagation within a few meters from the point of ingress.

EXAMPLE 4
Capacity to Maintain the Transmission Capacity in the Event of Ingress of Water A two-layer tubular element was prepared as described in Example 3, using the material 3a of Table 1 as inner layer. Five meters of this tubular element, containing 12 optical fibres, were placed in jumble and laid horizontally on the shelf of a climatic chamber. One end of the tubular element was connected, by means of a hermetic joint, to a 1 m glass pipette, which was initially empty, placed vertically outside the climatic chamber.

The 12 optical fibres were passed through the pipette.

Each fibre was then welded, outside the pipette, at one end to a length of junctioned optical fibre and connected via this route to a Fujikura FLU-312 LED optical source, while the other end was connected to one of the inlets of a Fujikura FPM-Go1 optical power sensor which supplied a Fujikura FPM-01 optical power meter.

The fibres were supplied with light at 1550 nm, this being a wavelength at which the fibres are particularly sensitive to microbending stresses.

After assembly was complete and the readings on all the optical fibres had stabilized, the reading was zeroed such that, from that moment onwards, each channel provided the difference between the instantaneous power transmitted by the fibre and the initial value at the time of zeroing.

At this point, at a temperature of 20° C., the pipette was filled with water, maintaining a constant head of 1 m relative to the plane on which the jumbled tubular element lay. Once stoppage of the flow of water had been achieved (it was subsequently found that this took place on average in 3.75 m of tubular element), recording of the variations in power transmitted were commenced, while changing the temperature in steps each 20–24 hours.

The minimum temperature reached during the experiment was −40° C.

The attenuation values obtained, as an average of three repeated tests, on 4 fibres, are given in Table 4 below.

TABLE 4

Effect of temperature cycles on the attenuation at 1550 nm following the blocking of water

| Hours | 0 | 0 | 20 | 21 | 23 | 25 | 26 | 28 | 30 |
|---|---|---|---|---|---|---|---|---|---|
| T (° C.) | 20 | 20* | 20 | 10 | 0 | −15 | −30 | −40 | 20 |
| Fibre | | | variation in attenuation (dB) | | | | | | |
| #1 | 0 | 0 | −0.02 | 0.01 | 0 | −0.01 | −0.01 | −0.03 | 0.03 |
| #2 | 0 | 0 | 0 | 0.01 | 0.01 | 0.02 | 0.01 | −0.01 | 0 |
| #3 | 0 | 0 | −0.01 | 0 | 0 | 0.01 | 0 | −0.02 | −0.02 |
| #4 | 0 | 0 | −0.01 | 0.01 | 0.02 | 0.03 | 0.03 | 0.02 | −0.03 |

*ingress of water

As can be seen, the action of the water-soluble material on the water penetrating into the cable does not give rise to large variations in attenuation, even in the presence of large variations in temperature.

Consequently, the system can be maintained in normal working mode even after the accidental penetration of water and, only when convenient to do so, after the point of ingress of the water has been localized, for example by accurate measurement of the attenuation, the necessary repairs and/or replacements can be carried out, for example after a few months.

EXAMPLE 5
Capacity for Blocking Water Penetration in a Cable

This test consisted in subjecting an optical fibre cable to a constant head of one meter of water over the entire section of the cable, corresponding to a pressure of 0.1 bar, and in measuring the time taken by the water front to come to a complete stop inside the cable.

The optical fibre cable used in this test essentially had the structure represented in FIG. 3, and in particular consisted of:
- a central glass-resin support (5) 3 mm in diameter;
- a VA-VAc copolymer tape 13 mm in width and 0.3 mm in thickness, wound in a spiral with an overlap of about 50% around the support, to form the coating (6);
- seven tubular elements (7) with an outside diameter of 3 mm, wound into a helix around this wrapped support, these tubular elements consisting of a double layer, the inner layer, made of VA-VAc copolymer, having a thickness of 0.35 mm, while the outer layer, made of low density polyethylene, had a thickness of 0.4 mm;
- 11 optical fibres with a diameter of about 250 μm placed loosely inside each tubular element;
- a second tape of VA-VAc copolymer, 14 mm in width, 0.35 mm in thickness, wrapped in a spiral with an overlap of about 50% around the ensemble of tubular elements, to form the wrapping (8);
- a low density polyethylene outer sheath (11) about 1 mm in thickness.

In contrast with the cable shown in FIG. 3, the reinforcing layer or armouring (9) was not present.

The VA-VAc copolymer (Mowiol, Hoechst AG) used to make the various elements of the cable mentioned above has a viscosity index of 10, a degree of hydrolysis of 74 and is plasticized with 5% glycerol, and is denoted by 3a in Table 1.

A glass column one meter in length was filled with water containing a dye (methylene blue) to enable the front of the fluid inside the cable to be distinguished, and was connected to one end of the cable as described above.

The test was carried out at ambient temperature on a cable 6 m in length.

Table 5 shows the length of cable through which the fluid front flows and the time taken for this travel.

TABLE 5

Longitudinal penetration of water in the cable

| Time | Length (cm) |
|---|---|
| 30 seconds | 116 |
| 60 second | 172 |
| 90 seconds | 198 |
| 120 second | 215 |
| 150 seconds | 226 |
| 180 seconds | 237 |
| 24 hours | 280 |
| 48 hours | 280 |
| 7 days | 280 |

As shown in Table 5, the cable was capable (after only 24 hours) of blocking the flow of fluid inside it less than 3 m from the point of infiltration of this fluid.

EXAMPLE 6
Solubility Properties of the Materials

To evaluate the water-soluble polymer materials, two plates were moulded with dimensions of about 20×30×1 mm, using the material 3a for the first plate and the material 1b for the second plate (see Table 1 for the characteristics of the materials). These plates, which were preweighed, were immersed in test containers filled with one liter of water, at 25° C. for 4 minutes.

The samples removed from the water were shaken to get rid of the more liquid parts and were weighed immediately.

The samples thus weighed were then scraped with a spatula so as to remove the viscous solution adhering to the surface, and were reweighed.

The scraped and weighed samples were placed in an oven to dry. The final dry weight of the test sample was obtained after drying.

The spatulas and glassware used to remove the viscous solution from each sample were washed thoroughly with water and this water was collected and dried in an oven. The weight of the dry residue, i.e. of the polymer present in the viscous solution in contact with the plate, was obtained at the end.

On the basis of the measurements carried out, it was found that, after immersion in water for 4 minutes, the test sample of material 3a showed a concentration of polymer in the viscous solution in contact with the test sample of about 17.5% by weight. From curve 51 in FIG. 5, which shows the change in viscosity as a function of the concentration of the specific material, one arrives at the viscosity of the related solution, which is about $2.7 \times 10^4$ cP. Moreover, it is calculated that about 25 g of polymer per $m^2$ of surface area of the test sample were dissolved in the water in the test container. The total amount of polymer dissolved (in the viscous solution in contact with the test samples and in the water in the container) was about 42 g/$m^2$ of test sample, whereas the amount of water absorbed by the solid material was about 13% by weight.

Figure 5:
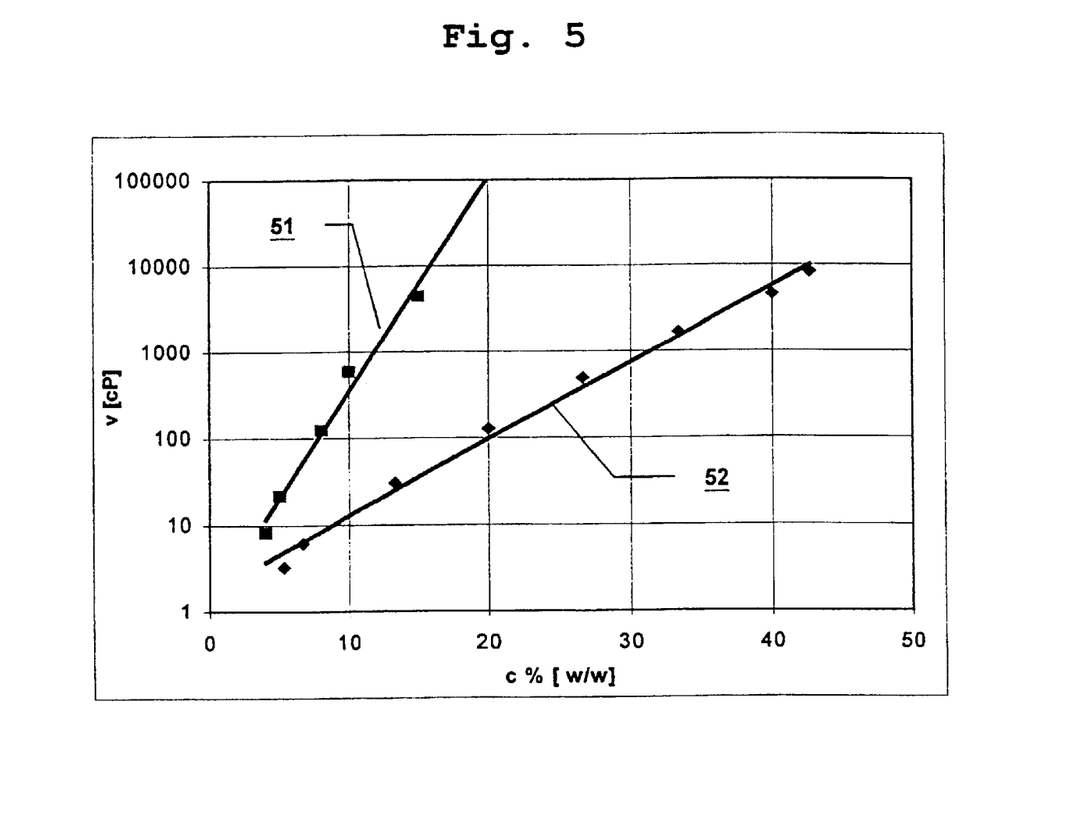
FIG. 5 is a graph of the viscosity of a water-soluble polymer as a function of its concentration in an aqueous solution.

In a similar manner, for the test sample of material 1b, a polymer concentration in the viscous solution in contact with the test sample of about 29% by weight is found, which, on the basis of the respective concentration/viscosity curve 52 in FIG. 5, corresponds to a solution viscosity of about 650 cP. This test sample released into the water in the test container about 65 g of polymer per m² of surface area of the test sample. The total amount of polymer dissolved was about 99 g/m², and the amount of water absorbed by the solid material was about 12.5% by weight.

With reference to the example described above, it has been observed that materials with suitable properties are obtained, in particular those for which, under the test conditions, viscosity values of at least about $10^4$ cP are measured, i.e. materials capable of forming, relatively rapidly, a solution which is viscous enough to block the flow of water. Moreover, for materials which, under the test conditions, show viscosity values of less than about $10^3$ cP, the reduced viscosity of these solutions entails an undesired increase in the blocking time and blocking distance of water in the experimental tests.

EXAMPLE 7

Mechanical Properties of the Materials

A comparison between the mechanical properties of a of a water-soluble polymer material which can be used in a cable according to the present invention (vinyl alcohol/vinyl acetate copolymers sold under the brand name Mowiol by the company Hoechst) and the corresponding properties of conventional materials used in cables (high density polyethylene—HDPE— and polybutylene terephtalate—PBT) is given in the following table. The values of the VA-Vac copolymer are referred to a Mowiol® 23/88 copolymer containing 18–20% (w/w) of pentaerythritol and 3–5% (w/w) of glycerine. In the case of the VA-Vac copolymer, measures of the mechanical properties were made on buffer tubes conditioned at 0%, 10% and 30% of relative humidity (RH), respectively. The 0% RH was obtained by placing the tests piece at 60° C. in oven under vacuum for one night. The 10% and 30% RH were obtained by conditioning the samples at room temperature at the respective RH values for two weeks.

The mechanical properties were measured on the materials extruded as buffer tubes (outside diameter of about 2.5 mm, inner diameter of about 1.8 mm, test pieces of about 60 mm length), using a Instron mod. 4501 dynamometer, with a load cell of 1 kN, according to the following procedure.

Two metallic rods (about 20 mm length) were inserted at each end of the tube to avoid the tube crash between the dynamometer grips. The two ends of the tube were then inserted into the dynamometer grips, which grips were set at an initial distance of 25 mm from each other. The grips were then moved apart from each other at a speed rate of 25 mm/min. The tensile modulus was determined by using the Instron Series IX Materials Testing System software.

TABLE 6

Mechanical properties

|  | T.S. [MPa] | E.B. [%] | Modulus E [MPa] |
| --- | --- | --- | --- |
| HDPE (DGDK 3364) | 19 | 580 | 350 |
| PBT (Hüls) | 40 | 290 | 750 |
| PVA 0% RH | 67 | 120 | 1300 |
| PVA 10% RH | 60 | 150 | 720 |
| PVA 30% RH | 67 | 170 | 250 |

(T.S. = Tensile strength, E.B. = elongation at break)

As shown in the above table 6, the mechanical properties of PVA are comparable to those of conventional materials used for manufacturing structural elements of the optical cables. The changes in the mechanical properties depending on the exposure to different values of RH are within the acceptable range. In particular, as the material is preferably dried before being extruded, the 0% RH conditions correspond typically to the RH humidity to which the material is exposed during and after it has been extruded. If the water-soluble material is coextruded together with an outer layer of a conventional material, said outer layer will act as a barrier against the outer RH and thus the mechanical properties of the material will remain unaltered for a relatively long period. On the other side the mechanical properties measured at the 10% RH conditioning correspond substantially to the mechanical properties of the extruded material exposed to ambient air (25° C., 40% RH) for about one week, which is the typical maximum storing period of a buffer tube before being inserted into a cable structure. When the structural element made from or containing the water-swellable material is disposed within the cable structure, the barrier effect of the surrounding cable's structure towards outer RH will then substantially limit the variation of the mechanical properties of the material. In any case, it should be noted that the material is required to possess mechanical properties comparable to those of conventional materials in particular during the manufacturing steps of the cable and during the laying operations of the same, when the cable is more subjected to stresses and possible damages.

What is claimed is:

1. An optical fibre cable comprising a longitudinal cavity extending along the length of the cable, at least one optical fibre housed inside said longitudinal cavity, said longitudinal cavity further comprising a solid and compact element within it, wherein said solid and compact element comprises a water-soluble polymer material which, following accidental ingress of water into the cable, is capable of forming an aqueous solution with a predetermined viscosity such as to block the flow of water within 10 meters of the point of ingress.

2. An optical fibre cable according to claim 1, wherein said solid and compact element comprises about 30% by weight or more of the water-soluble polymer material.

3. An optical fibre cable according to claim 1, wherein said solid and compact element comprises about 50% or more of the water-soluble polymer material.

4. An optical fibre cable according to claim 1, wherein said solid and compact element comprises more than about 75% by weight of the water-soluble polymer material.

5. An optical fibre cable according to claim 1, wherein said solid and compact element is a structural element of the cable and contains and protects the at least one optical fibre disposed within said longitudinal cavity.

6. An optical fibre cable according to claim 5, wherein said structural element is a tubular element and said longitudinal cavity is defined by the inner volume of said tubular element.

7. An optical fibre cable according to claim 6, wherein said tubular element comprises a two-layer wall in which the inner layer is made from the water-soluble solid material and the outer layer is made from a water-insoluble polymer material.

8. An optical fibre cable according to claim 7, wherein said tubular element comprises a third outer layer made of water-soluble solid polymer material.

9. An optical fibre cable according to claim 6, wherein said tubular element is made from a single sheath of said water-soluble solid material.

10. An optical fibre cable according to claim 5, wherein said structural element which contains the at least one optical fibre is a grooved core comprising at least one groove longitudinally disposed on the outer surface of said core and the longitudinal cavity is defined by the inner volume within said groove.

11. An optical fibre cable according to claim 10, wherein at least the walls of said groove are made from a water-soluble solid polymer material.

12. An optical fibre cable according to claim 10, wherein said grooved core is made completely from said water-soluble solid polymer material.

13. An optical fibre cable according to claim 1, wherein the solid and compact element made of water-soluble polymer material is a tape.

14. An optical fibre cable according to claim 1, wherein the water-soluble polymer material has a solubility in water of at least about 100 g/l.

15. An optical fibre cable according to claim 11 wherein said aqueous solution has a viscosity of at least about $10^4$ cP at 20° C.

16. An optical fibre cable according to claim 14, wherein said aqueous solution contains an amount of water-soluble polymer material of between about 100 g/l and about 250 g/l.

17. An optical fibre cable according to claim 1, wherein in the presence of a relative humidity of greater than 75% outside said cavity, the relative humidity inside said cavity is maintained below about 75% for a predetermined period of time.

18. An optical fibre cable comprising a cavity and a solid and compact element associated with said cavity, wherein said solid and compact element comprises a water-soluble polymer material and wherein, in the presence of a relative humidity of substantially less than or equal to about 80%, the water-soluble polymer material absorbs an amount of water of less than about 25% of the amount of water which can be absorbed by the water-soluble solid material under saturation conditions.

19. An optical fibre cable according to claim 1 or 18, wherein the water-soluble polymer material is a water-swellable material.

20. An optical fibre cable according to claim 1 or 18, wherein the water-soluble material is polyacrylamide, modified polyvinyl alcohol, vinyl alcohol/vinyl acetate copolymer, polyvinylpyrrolidone or mixtures thereof.

21. An optical fibre cable according to claim 20, wherein the water-soluble material is a vinyl alcohol/vinyl acetate copolymer obtained by partial hydrolysis of the acetate groups of a polyvinyl acetate homopolymer.

22. An optical fibre cable according to claim 21, wherein the degree of hydrolysis of the acetate groups of the polyvinyl acetate homopolymer is between about 50% and about 95%.

23. An optical fibre cable according to claim 20, wherein the vinyl alcohol/vinyl acetate copolymer has a viscosity index of greater than about 5.

24. An optical fibre cable according to claim 1 or 18, wherein the water-soluble polymer material has a breaking load of greater than about 15 MPa and an elastic modulus of greater than about 200 MPa.

25. An optical fibre cable according to claim 1, wherein the ratio between the cross section of said cavity and the perimeter of said water-soluble element in contact with said cavity is less than about 0.5 mm.

26. An optical fibre cable according to claim 25, wherein, when the water-soluble polymer forms an aqueous solution having a viscosity of at least about $10^4$ cP when contacted with water, said ratio is less than about 0.4 mm.

27. An optical fibre cable according to claim 1, wherein the cross section of the solid element made of water-soluble material is not less than about 10% of the free cross section of the cavity with which said solid element is associated.

28. An optical fibre cable according to claim 1, wherein the cross section of the solid element made of water-soluble material is not less than about 20% of the free cross section of the cavity with which said solid element is associated.

29. An optical fibre cable according to claim 1, wherein the cross section of the solid element made of water-soluble material is not less than about 40% of the free cross section of the cavity with which said solid element is associated.

* * * * *

UNITED STATES PATENT AND TRADEMARK OFFICE
CERTIFICATE OF CORRECTION

PATENT NO. : 6,577,796 B2  Page 1 of 1
DATED : June 10, 2003
INVENTOR(S) : Perto Anelli et al.

It is certified that error appears in the above-identified patent and that said Letters Patent is hereby corrected as shown below:

<u>Column 25,</u>
Line 17, "claim 11" should read -- claim 1 --.

Signed and Sealed this

Second Day of March, 2004

JON W. DUDAS
*Acting Director of the United States Patent and Trademark Office*